F. BÖLLING.
ELECTRICAL COOKING VESSEL.
APPLICATION FILED OCT. 4, 1910.
995,434.
Patented June 20, 1911.
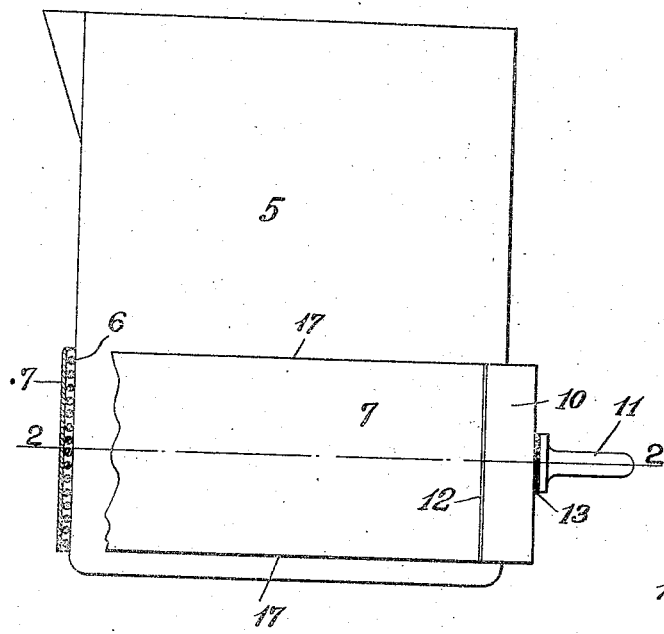
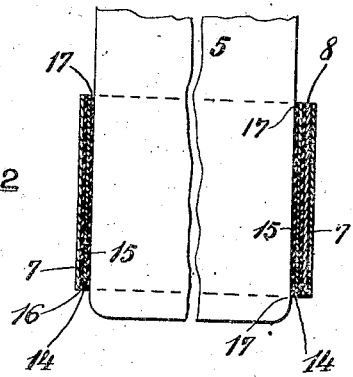
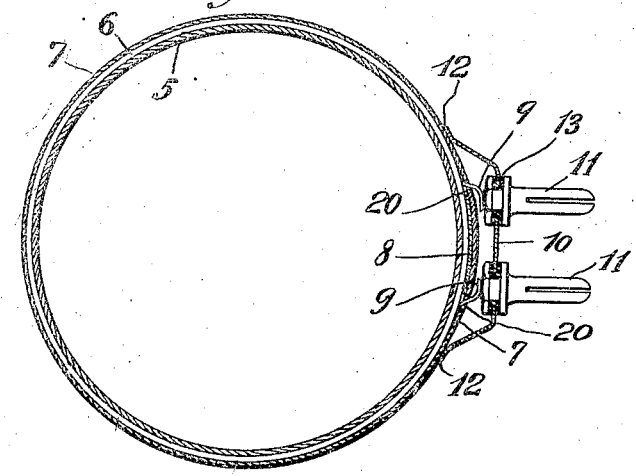
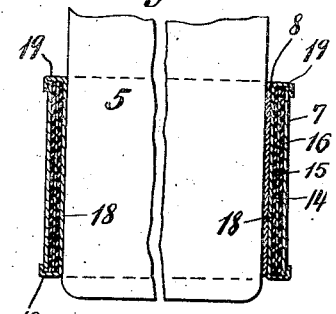
WITNESSES
E. P. La Gay
John Herr
Friedrich Bölling INVENTOR
BY his
Binney & Mastick ATTORNEYS ically cutting off the supply of cur-
UNITED STATES PATENT OFFICE.

FRIEDRICH BÖLLING, OF OBERURSEL, NEAR FRANKFORT-ON-THE-MAIN, GERMANY, ASSIGNOR TO THE PROMETHEUS ELECTRIC COMPANY, OF NEW YORK, N. Y., A CORPORATION OF NEW YORK.

ELECTRICAL COOKING VESSEL.

995,434.

Specification of Letters Patent. Patented June 20, 1911.

Application filed October 4, 1910. Serial No. 585,204.

*To all whom it may concern:*

Be it known that I, FRIEDRICH BÖLLING, a citizen of the Kingdom of Prussia, and residing in Oberursel, near Frankfort-on-the-Main, Germany, have invented certain new and useful Improvements in Electrical Cooking Vessels, of which the following is a specification.

This invention relates to electrical cooking vessels and has particular reference to improvements in the arrangement and mounting of the heating element on the vessel.

The main objects of the invention are to provide a heating element of simple and efficient construction; to provide means for automatically cutting off the supply of current when the temperature increases beyond a predetermined degree; to mount the heating element on the vessel without the use of special fastening means such as screws or the like; and to provide a heating element adapted for use on non-metallic vessels.

Other objects will appear as this specification proceeds.

To this end the invention comprises such elements, features, arrangements and combinations of parts as hereinafter set forth in detail, while reference is had to the accompanying drawings, which latter, however, are to be read as illustrative only, and in no way as showing the only possible embodiment of the invention.

In the said drawings, Figure 1 is an elevation, partly in section, of an electrical cooking vessel embodying my invention; Fig. 2 is a transverse sectional view on the line 2—2 of Fig. 1; Fig. 3 shows a modification of the heating element, and Fig. 4 shows a heating element adapted for use on non-metallic vessels.

Referring to Figs. 1 and 2 the reference numeral 5 represents a suitable metallic cooking vessel, around the lower portion of which there is placed the heating element, the particular construction of which is immaterial for the purpose of this disclosure, but which in this instance is shown as consisting of a wire 6, provided with a suitable insulating covering (not shown) wound around the vessel. Outside the heating element there is provided a retaining member 7 in this instance in the form of a metallic ring. A wedge member 8, Fig. 2, is driven in between the heating element and the retaining member to secure these parts firmly to the vessel. The ends of the heating element are bent outward through suitable openings 20 in the retaining ring 7 and insulated therefrom to form conducting fingers 9, 9. The openings in the ring 7 and the finger 9 are covered by a cap 10 to which is secured the terminal bolts 11, 11 adapted to be connected to the electrical conduits for supplying the current. The inner ends of the terminal bolts 11 abut the fingers 9 for transmitting the current to the wire 6. The wedge 8 is preferably driven in under the retaining ring at the point where the cap 10 is to be placed so as to hide the wedge and enhance the appearance of the device. The cap is soldered at 12 to the ring 7 by means of soft solder which melts when the temperature rises beyond a predetermined degree. When this happens the solder melts, the cap falls off and the current is automatically cut off. The bolts 11 are insulated from the cap by suitable insulating washers 13, 13.

Fig. 3 shows a heating element which may consist of a coating of conducting material 14 produced by electrolytical precipitation on a strip of mica or other suitable insulating material 15. A similar insulating member 16 is placed on the outside of the conducting member. A retaining ring 7 as previously described in connection with Figs. 1 and 2 is also provided, together with a wedge 8 for securing the parts firmly to the vessel. With this form of heating element I use the cap 10 and terminals 11 as above described.

The two above described forms of heating elements are suitable for use on metallic vessels. Preferably the retaining ring 7 and the cap 10 consist of the same metal as the vessel. The edges of the ring 7 are preferably soldered at 17, 17 to the vessel to prevent water from reaching the heating element.

The heating means shown in Fig. 4 is suitable for use on non-metallic vessels. The heating element and retaining ring are in this instance the same as shown in Fig. 3 and numbered to correspond, but between the vessel and the heating element there is provided an inner ring 18 having flanges 19, 19 which are bent over and soldered to the retaining ring 7. The cap 10 is soldered to the ring 7 as before, but the wedge 8 is inserted between the ring 18 and the vessel so that in this instance the heating means as a whole may be detached from the vessel by removing the wedge.

The above is thought to clearly explain this invention. It will be seen that I have provided a self-contained heating means for cooking vessels which can be attached to the latter without any special fastening means except the insertion of the wedge member; and in the case of non-metallic vessels the heating means may be attached and detached at will.

The invention is susceptible of changes in the detailed constructions, but I claim all such changes as come within the intended and legitimate scope of the invention and the claims.

I claim and desire to obtain by Letters Patent the following:—

1. The combination of a vessel, a heating element, an outer retaining member and a wedge inserted between the latter and the said element for securing the retaining member and the heating element to the vessel.

2. The combination of a vessel, a heating element, insulating material placed on both sides of the latter, a retaining member and a wedge inserted between the outer layer of said insulating material and the said retaining member for securing the aforesaid parts to the vessel.

3. The combination of a vessel, a heating element wound on the same and insulated therefrom, a retaining member on the outside of said element, the terminals of the latter projecting through said retaining member, a terminal cap secured to the said member, terminal bolts in the said cap and in contact with the terminals of the said element and means interposed between the said retaining member and the said element for securing the parts to the vessel.

4. The combination of a vessel, a heating element surrounding the same, a retaining member, a wedge for securing the element and the retaining member to the vessel, a terminal cap, terminal bolts in said cap and in contact with the terminals of the said heating element and a fusible element for securing said cap to the said retaining member.

5. The combination of a vessel, a heating element surrounding the same and insulated therefrom, a retaining member outside said element, a cap secured to said member, terminal bolts in said cap and in contact with the terminals of the said element, and a wedge member inserted between the element and said retaining member for securing the parts to the vessel.

6. The combination of a vessel, a heating element therefor comprising an insulated conductor, a retaining ring, a wedge inserted between the vessel and the said ring for securing the parts in frictional contact with the said vessel, openings formed in the said rings for the terminals of the conductor, a cap secured to the ring over the said openings, terminal bolts in said cap and in contact with the terminals of the conductor, the edges of the said ring being soldered to the vessel and a fusible element for securing the said cap to the ring.

7. The combination of a vessel, a heating element, an inner and an outer retaining member, means for securing the said two members to one another, means for insulating said members from the heating element and a wedge member inserted between the said vessel and the said inner retaining member for securing the parts to the vessel.

In testimony whereof I have signed this specification in the presence of two subscribing witnesses.

FRIEDRICH BÖLLING.

Witnesses:
EMMIE V. BOÉVIE,
GEORGE G. SCHREIBER.